Jan. 5, 1965 B. BRIGHTMAN 3,164,681

SIGNALING GENERATOR

Filed Nov. 21, 1961 2 Sheets-Sheet 1

INVENTOR.
BARRIE BRIGHTMAN
BY
George W. Killian
AGENT

Jan. 5, 1965 B. BRIGHTMAN 3,164,681

SIGNALING GENERATOR

Filed Nov. 21, 1961 2 Sheets-Sheet 2

United States Patent Office 3,164,681

Patented Jan. 5, 1965

3,164,681

SIGNALING GENERATOR

Barrie Brightman, Webster, N.Y., assignor to General Dynamics Corporation, Rochester, N.Y., a corporation of Delaware Filed Nov. 21, 1961, Ser. No. 153,843
2 Claims. (Cl. 179—84)

This invention relates in general to signaling systems and, more particularly, to telephone signaling systems.

Although the invention herein disclosed is suitable for more general applications, it is particularly adapted for use in automatic telephone systems. In telephone systems, it is necessary to provide a signaling device to summon a called party to a telephone. The most widely used signaling device is the conventional ringer, which comprises a gong, a clapper, and an electromagnetic circuit to actuate the clapper and cause it to strike the gong. Other signaling devices, such as chimes, lamps, buzzers, or gongs, as well as electronic or tone ringers, are used on occasion. When two or more signaling devices are connected to the same line, it is desirable to selectively operate the desired one, thereby obviating the need for code ringing. There are various methods used to selectively operate a predetermined one of a plurality of signaling devices on a party line. For example, when conventional telephone ringers are employed, they may be designed both electrically and mechanically to respond to signals of a predetermined frequency only. Thus, electrical signal of the required frequency is applied to the lie. In such systems, it is obviously necessary to include ferent frequencies. Because of the expense of such gen- the lie. In such systems, it is obviously necessary to include generating equipment to produce each of the required different frequencies. Because of the expense of such generating equipment, it is customary to employ not more than five different frequencies, and use divided ringing and/or code ringing if it is desired to have more than five separate parties on a line. The ringing generating equipment is usually provided in duplicate; the main or primary ringing power supply being operated from the commercial A.C. power, while reserve batteries provide the power to operate the standby or secondary ringing supply. It is evident that material savings could be realized if the ringing generator equipment could be eliminated or simplified.

It is the general object of this invention to provide new and improved signal generating equipment.

It is a more particular object of this invention to provide a new and improved signal generator which can produce an output signal at any desired frequency.

It is another object of this invention to provide a signal generator which produces an output signal in response to a control signal.

It is another object of this invention to provide a signal generator which consumes a minimum amount of power when it is in its standby condition.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawings which comprise four figures on two sheets.

It is to be understood that only the details of the circuits necessary to understand the invention have been shown. For example, although the utility of the invention is shown in a telephone system, the various ancillary switching circuits are not shown in detail as they may take any of the well known forms, such as step-by-step or crossbar switching equipment, etc. In addition, the circuit means for generating control pulses are not illustrated as various well known and conventional pulse generators are available to produce the required control pulses.

Figure 4:
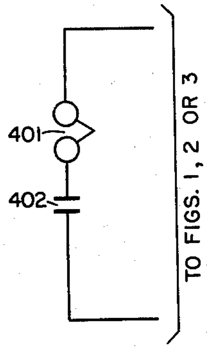
FIG. 4 illustrates a conventional ringer circuit which may be connected to any one of the lines.
Figure 1:
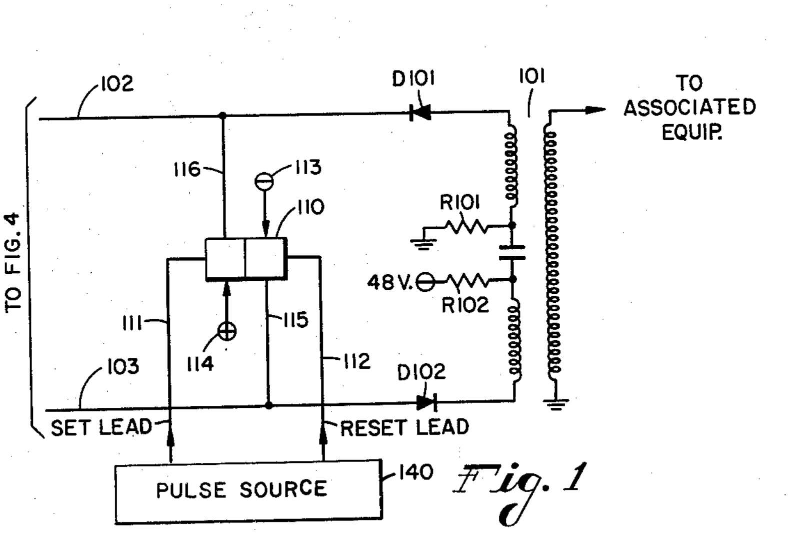
FIG. 1 shows the invention in logic diagram form.

It is believed that the invention can best be understood by first considering FIG. 1, which illustrates the invention in logic diagram form. 101 illustrates a line circuit transformer, or repeat coil as it is customarily designated in the telephone art. The remainder of the line circuit may take the form illustrated in the copending application of Barrie Brightman et al., Serial No. 78,091, filed December 23, 1960, and assigned to the same assignee as the present invention. Since electronic telephone switching systems are now well known in the art, it is believed that it would unnecessarily obscure and mask the present invention if additional details of the line circuit were shown. Line conductors 102 and 103 connect the subscribers' telephone instruments, not shown, to the line circuit. D.C. current is supplied from the line circuit to the connected subscribers' telephone instruments from ground through resistor R101, the upper section of repeat coil 101, diode D101, to line conductor 102. The current flows through the telephone instrument and hookswitch contacts, not shown, and returns on line conductor 103 and through diode D102, the lower section of repeat coil 101, and resistor R102 to the negative terminal of the D.C. power supply. At each subscriber's station, there is a ringer 401 and a capacitor 402 connected in series and bridged across the line conductors 102 and 103. For the purpose of this description, it will be assumed that ringer 401 is a signaling device of the type which is designed to respond only to signals of a predetermined frequency. At the central office end of the line conductors 102 and 103, there is a bistable switching circuit 110 which is coupled between the conductors. The bistable switching circuit 110 will respond to an input signal on set lead 111 to apply a positive potential 114 to line conductor 102 through lead 116, and to apply a negative potential 113 to line conductor 103 through lead 15. In response to an input signal on reset lead 112, the positive and negative potentials are removed from line conductors 102 and 103, respectively. Accordingly, in response to alternate set and reset input signals from pulse source 140, the bistable switching device 110 will apply and remove a positive potential on one of the line conductors and a negative potential on the other line conductor. Diode D101 prevents any current from flowing in line conductor 102 towards resistor R101 and, in a similar manner, diode D102 prevents any flow of current from the negative potential connected to resistor R102 from flowing towards line conductor 103. Or phrased differently, diodes D101 and D102 isolate the line circuit transformer from the ringing circuit.

When the bistable switching circuit 110 is set, it will be seen that there is a potential difference between line conductors 102 and 103 equal to the sum of the positive potential applied to line conductor 102 and the negative potential applied to line conductor 103. The polarity is such as to produce a surge of conventional current from line conductor 102 through ringer 401 and capacitor 402 to line conductor 103. When the bistable switching circuit 110 is reset to remove the positive and negative potentials from line conductors 102 and 103, respectively, it will be seen that the potential difference between line conductors 102 and 103 seeks to return to the potential connected to resistors R101 and R102. Capacitor 402 will discharge through ringer 401 until the line conductors are restored to their initial potential or until the bistable circuit is set again. Accordingly, there is a surge of current through ringer 401 everytime the bistable circuit 110 is set. Therefore, by setting and resetting the bistable circuit 110 at a controlled rate, pulses of current are passed through ringer 401 at the controlled rate. Thus, bistable circuit 110 can be used as a signal generator to generate signals at a plurality of frequencies. The pulse source 140 may be a relatively simple, small and inexpensive circuit. For example, a multivibrator may be used to set and reset the bistable circuit 110 at any of the desired rates.

The bistable circuit 110 is of the type which is conventionally referred to as a flip-flip circuit. That is, in response to a first input sgnal, both halves of the flip-flip are rendered conductive and in response to a second input signal, both halves are turned off.

Figure 2:
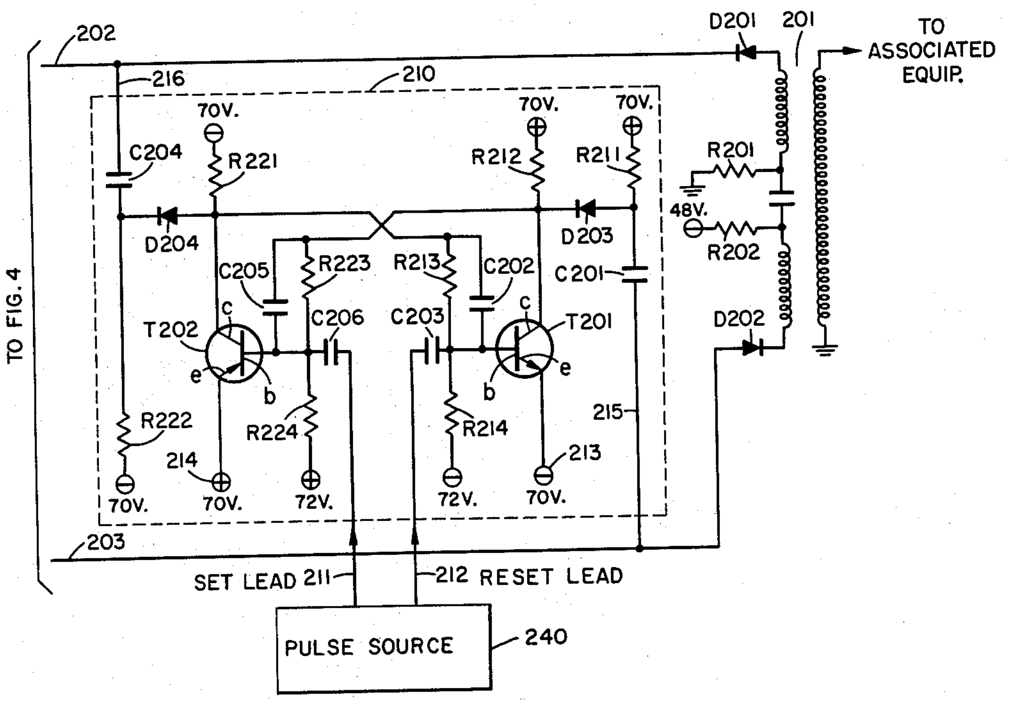
FIGS. 2 and 3 show separate embodiments of the invention.

FIG. 2 illustrates a convenient transistorized form of the bistable circuit 110. Elements illustrated in FIG. 2 which correspond to elements illustrated in FIG. 1 have smilar designations except for the first digit. The bistable flip-flip circuit of FIG. 2 comprises two transistors T201 and T202. Transistor T201 is an NPN transistor, while transistor T202 is a PNP transistor. When the two transistors are not conducting, the circuit is arranged to maintain them in the non-conducting state. For example, the base *b* of transistor T202 is maintained slightly positive with respect to its emitter by the more positive potential which is connected to resistor R224. In a similar manner, the base *b* of transistor T201 is held slightly negative with respect to its emitter by the more negative potential which is connected to resistor R214. Under these conditions and with the potentials illustrated, it will be noted that with neither transistor conducting, the diodes D203 and D204 are back biased. That is, the series circuit from +70 volts through resistors R212, R223 and R224 to +72 volts makes the left-hand terminal of D203 slightly positive with respect to its right-hand terminal. In a similar manner, the right-hand terminal of diode D204 is held slightly negative with respect to its left-hand terminal. If the subscriber's loop is opened, that is, if the connected phones are on-hook, there will be no current flow through resistors R201 and R202 or the line conductors 202 and 203. Therefore, capacitor C204 will be charged to 70 volts with its upper plate at ground potential and the lower plate at −70 volts. In a similar manner, capacitor C201 will be charged to 118 volts with the upper plate at +70 volts and the lower plate at −48 volts.

*Setting bistable circuit 210.*—When a negative-going pulse from pulse source 240 is applied to set lead 211, the base *b* of transistor T202 is made negative with respect to its emitter *e* and, therefore, PNP transistor T202 commences to conduct. With transistor T202 conducting, the lower terminal of resistor R221 is raised to substantially +70 volts and a pulse is passed through capacitor C202 to drive the base of NPN transistor T201 positive with respect to its emitter *e* and, therefore, transistor T201 starts to conduct. With transistor T201 conducting, the lower terminal of R212 is lowered to substantially −70 volts. The resistor pairs R224, R223 and R214, R213 are chosen so that when the transistors are conducting, the base *b* of transistor T202 is maintained slightly negative with respect to its emitter *e*, while the base of transistor T201 is maintained slightly positive with respect to its emitter. That is, the resistors R224 and R214 have a low resistance compared to resistors R223 and R213. Accordingly, once the transistors are triggered "on" they are maintained in the conducting state. With the transistors turned "on," the diodes D203 and D204 are forward biased. Accordingly, the bottom plate of C204 is raised from −70 volts to +70 volts, while the top plate of C201 is reduced from +70 volts to −70 volts. The potential between line conductors 202 and 203 is, therefore, increased by 280 volts. The diodes D201 and D202 are back biased to effectively isolate the line circuit transformer. Current will commence to flow from line conductor 202 through signaling device 401 and capacitor 402 to line conductor 203. Capacitors C204 and C201 will start to discharge and capacitor 402 will charge. The discharging and charging of the named capacitors will, of course, reduce the potential difference between the line conductors.

*Resetting bistable circuit 210.*—As mentioned, the NPN transistor T201 and the PNP transistor T202 are maintained in their conducting state once they are turned "on" inasmuch as their bases are maintained slightly positive and negative, respectively, with respect to their emitters. The appropriate base potential is maintained by connecting appropriate potentials to resistors R224 and R214 and using resistors R224 and R214 which have appreciably smaller resistance than resistors R213 and R223.

The application of a negative-going pulse from pulse source 240 to reset lead 212 drives the base of transistor T201 negative with respect to its emitter, thereby turning "off" transistor T201. With transistor T201 turned "off," the base of transistor T202 becomes positive with respect to its emitter since resistors R212, R223 and R224 are once more in series. Therefore, transistor T202 is turned "off." With the transistors turned "off," the bottom plate of C204 drops from +70 volts to −70 volts, while the top plate of capacitor C201 changes from −70 volts to +70 volts. The potential difference between line conductors 202 and 203 is correspondingly reduced, and diodes D201 and D202 are no longer back biased. Capacitor 402 starts to discharge while capacitors C204 and C201 commence to recharge to re-establish the potential between the line conductors as the potential connected to resistors R201 and R202. As already shown, once the transistors are turned "off," they are maintained in their non-conducting state until a negative-going set pulse is applied to set lead 211.

Thus, in response to each set pulse with an intervening reset pulse, there is a surge of current through the signaling device 401. The rate at which the set and reset pulses are applied determines the frequency of the current surges through signaling device 401. By electrical and mechanical design, signaling devices may be made to respond to predetermined frequencies and, therefore, with a single bistable circuit, such as that illustrated in FIG. 2, it is possible to selectively operate a desired one of a group of parallel connected frequency-sensitive signaling devices.

It should be noted that when the bistable circuit 210 is in its reset condition, that is, with neither transistor conducting, it uses substantially no standby power.

Figure 3:
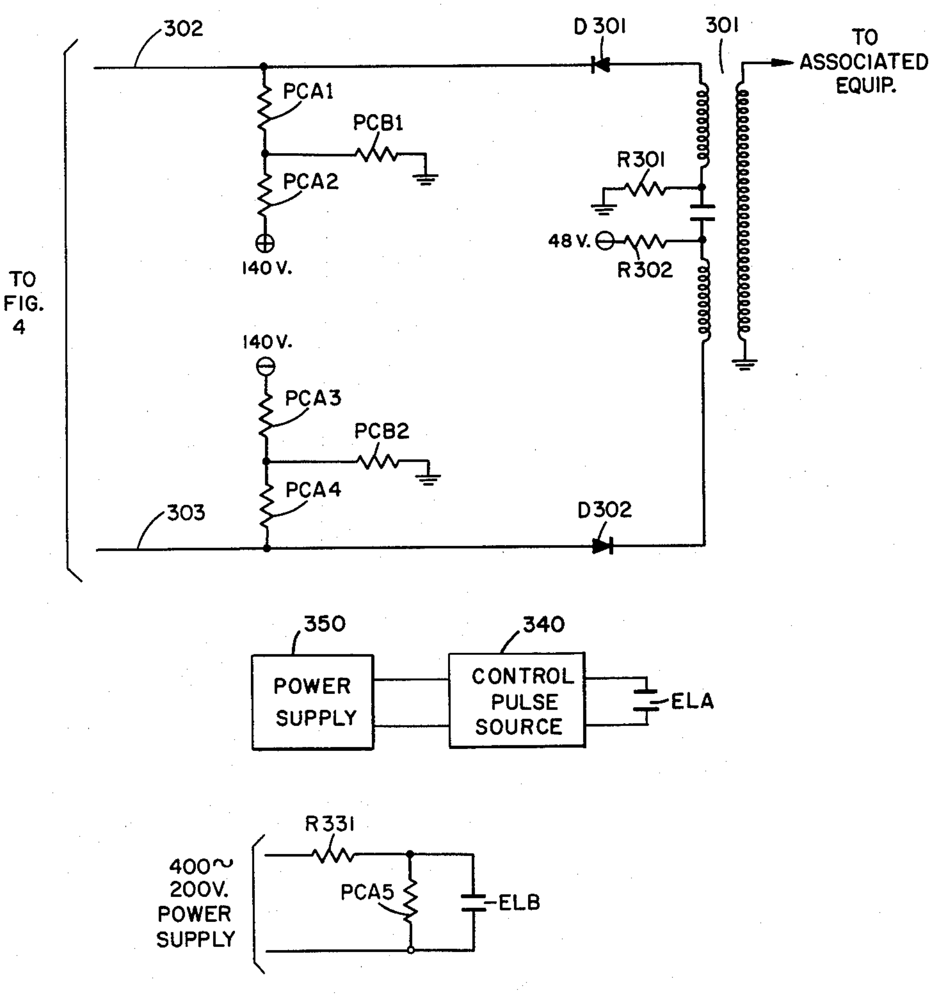

FIG. 3 illustrates another embodiment of the invention which is shown in logic diagram form in FIG. 1. The embodiment of FIG. 3 employs electroluminescent devices and photoconductors to provide a switching circuit. Elements illustrated in FIG. 3 which correspond to elements illustrated in FIG. 1 have corresponding designations except for the first digit. The elements designated with the prefix "PC" are photoconductors which exhibit a high resistance when not exposed to illumination, and exhibit a low resistance when they are exposed to illumination. The photoconductors which include the designation "A" are arranged to be illuminated by an electroluminescent device, designated "ELA," while the photoconductors which include the designation "B" are arranged to be illuminated by an electroluminescent device, designated "ELB." The copending application of Barrie Brightman, Serial No. 104,966, filed April 21, 1961, and assigned to the same assignee as the present invention, discloses a combination of electroluminescent devices and photoconductors which are particularly well adapted for use in this invention.

As may be seen in FIG. 3, the electroluminescent device designated ELB is connected to a power supply through resistor R331, and the electroluminescent device is shunted by photoconductor PCA5. Therefore, electroluminescent device ELB will be illuminated at all times except when photoconductor PCA5 is exposed to illumination from electroluminescent device ELA thereby providing a low impedance shunt across device ELB. Thus, when electroluminescent device ELB is illuminated, photoconductors PCB1 and PCB2 will exhibit a low impedance and when the electroluminescent device ELA is not connected to a source of power the PCA photoconductors will exhibit a high impedance. Therefore, the positive and negative 140 volt potential will be isolated from line conductors 302 and 303 when electroluminescent device ELB is illuminated.

When it is desired to couple the positive and negative 140 volt potential across the line conductors 302 and 303, the electroluminescent device ELA is connected to a power supply 350, at a repetition rate controlled by the control pulse source 340, thereby periodically illuminating the electroluminescent device ELA, and in response to each illumination thereof, the impedance of the PCA photoconductors is reduced, thereby periodically coupling the potential across the line conductors and causing current to flow through ringer 401. The diodes D301 and D302 serve to isolate the line circuit transformer from the ringing potential.

By applying potential to the electroluminescent device ELA at a controlled rate, the desired one of a plurality of parallel connected frequency-sensitive ringers, such as 401, may be selectively operated.

While there have been shown and described what are considered at present to be the preferred embodiments of the invention, modifications thereto will readily occur to those skilled in the art. It is not desired, therefore, that the invention be limited to the embodiments illustrated and described, and it is intended to cover in the appended claims all such modifications as fall within the true spirit and scope of the invention.

What is claimed is:

1. In a telephone system, a two-conductor telephone line for extending a connection from a telephone exchange to a telephone instrument, a telephone ringer for said telephone instrument, a capacitance, means for serially connecting said ringer and said capacitance between said two conductors of said line, a direct current voltage source of given magnitude, means including a first unidirectional conducting device poled to be forward biased for connecting one pole of said voltage source to one of said two conductors, means including a second unidirectional conducting device poled to be forward biased for connecting the other pole of said voltage source to the other of said two conductors, and a ringing current source for said ringer including a two-state device having a set condition and a reset condition, means coupled to said device for switching said device back and forth between its set and reset conditions at a predetermined frequency, and means effective only when said device is in its set condition for applying a ringing voltage across said two conductors of said line having a magnitude and polarity with respect to the magnitude and polarity of the voltage from said direct current voltage source for reverse biasing both said first and second unidirectional conducting devices.

2. The system defined in claim 1, wherein said predetermined frequency at which said device is switched back and forth between its set and reset conditions by said switching means coupled thereto may have any one of a given plurality of preselected values, and wherein said ringer is tuned to be resonant at only a single one of said preselected values of said predetermined frequency.

References Cited in the file of this patent

UNITED STATES PATENTS

| | | |
|---|---|---|
| 2,655,560 | Davidson | Oct. 13, 1953 |
| 2,715,161 | Lutze et al. | Aug. 9, 1955 |
| 2,763,726 | Wallar | Sept. 18, 1956 |
| 2,907,895 | Van Overbeek | Oct. 6, 1959 |
| 2,924,788 | Maurushat | Feb. 9, 1960 |
| 3,028,507 | Sacks | Apr. 3, 1962 |
| 3,113,217 | Huang et al. | Dec. 3, 1963 |

UNITED STATES PATENT OFFICE
CERTIFICATE OF CORRECTION

Patent No. 3,164,681 January 5, 1965

Barrie Brightman

It is hereby certified that error appears in the above numbered patent requiring correction and that the said Letters Patent should read as corrected below.

Column 1, line 29, after "Thus," insert -- when it is desired to have a particular ringer respond, an --; line 31, fo "lie" read -- line --; same column 1, lines 32 and 33, strike o "ferent frequencies. Because of the expense of such gen- the lie. In such systems, it is obviously necessary to include Signed and sealed this 3rd day of August 1965.

(SEAL)
Attest:

ERNEST W. SWIDER
Attesting Officer

EDWARD J. BRENNER
Commissioner of Patents